United States Patent
Eder et al.

(10) Patent No.: US 8,800,263 B2
(45) Date of Patent: Aug. 12, 2014

(54) DEVICE FOR EXHAUST GAS HEAT UTILIZATION

(75) Inventors: Andreas Eder, Munich (DE); Marco Ranalli, Augsburg (DE); Martin Adldinger, Holzheim (DE)

(73) Assignees: Faurecia Emissions Control Technologies, Germany GmbH, Augsburg (DE); Bayerische Motoren Werke AG, Munich (DE)

(*) Notice: Subject to any disclaimer, the term of this patent is extended or adjusted under 35 U.S.C. 154(b) by 631 days.

(21) Appl. No.: 13/046,810

(22) Filed: Mar. 14, 2011

(65) Prior Publication Data

US 2012/0060484 A1 Mar. 15, 2012

(30) Foreign Application Priority Data

Mar. 15, 2010 (DE) .................. 10 2010 011 472

(51) Int. Cl.
*F01N 3/00* (2006.01)
*F01N 5/02* (2006.01)
(52) U.S. Cl.
CPC *F01N 5/02* (2013.01); *F01N 5/025* (2013.01); *Y02T 10/16* (2013.01)
USPC .......................................................... 60/275
(58) Field of Classification Search
CPC ............ F01N 5/02; F01N 5/025; Y02T 10/16

USPC .......................... 60/287, 320, 527, 528, 529
See application file for complete search history.

(56) References Cited

U.S. PATENT DOCUMENTS

| 7,150,147 B2 * | 12/2006 | Murata ........................... 60/287 |
| 2005/0172993 A1 * | 8/2005 | Shimoji et al. ................. 136/208 |
| 2009/0038302 A1 * | 2/2009 | Yamada et al. .................. 60/320 |
| 2010/0146954 A1 * | 6/2010 | Sloss et al. ...................... 60/320 |

FOREIGN PATENT DOCUMENTS

| EP | 1852585 A1 * | 11/2007 | ................ F01N 5/02 |
| JP | 2000352313 A * | 12/2000 | ................ F01N 5/02 |

* cited by examiner

*Primary Examiner* — Thomas Denion
*Assistant Examiner* — Matthew T Largi
(74) *Attorney, Agent, or Firm* — Carlson, Gaskey & Olds, PC

(57) ABSTRACT

A device for exhaust gas heat utilization in internal combustion engines of motor vehicles includes an exhaust gas line which in sections includes a first exhaust gas flow duct and a second exhaust gas flow duct connected in parallel. A valve flap is movable between a closed position and an open position, which can selectively close or at least partly clear a flow cross-section of the first or second exhaust gas flow duct. At least one thermoelectric generator module is thermally coupled with the second exhaust gas flow duct and with a cooling circuit. The device also includes an expansion material actuator for temperature-dependent actuation of the valve flap.

19 Claims, 3 Drawing Sheets

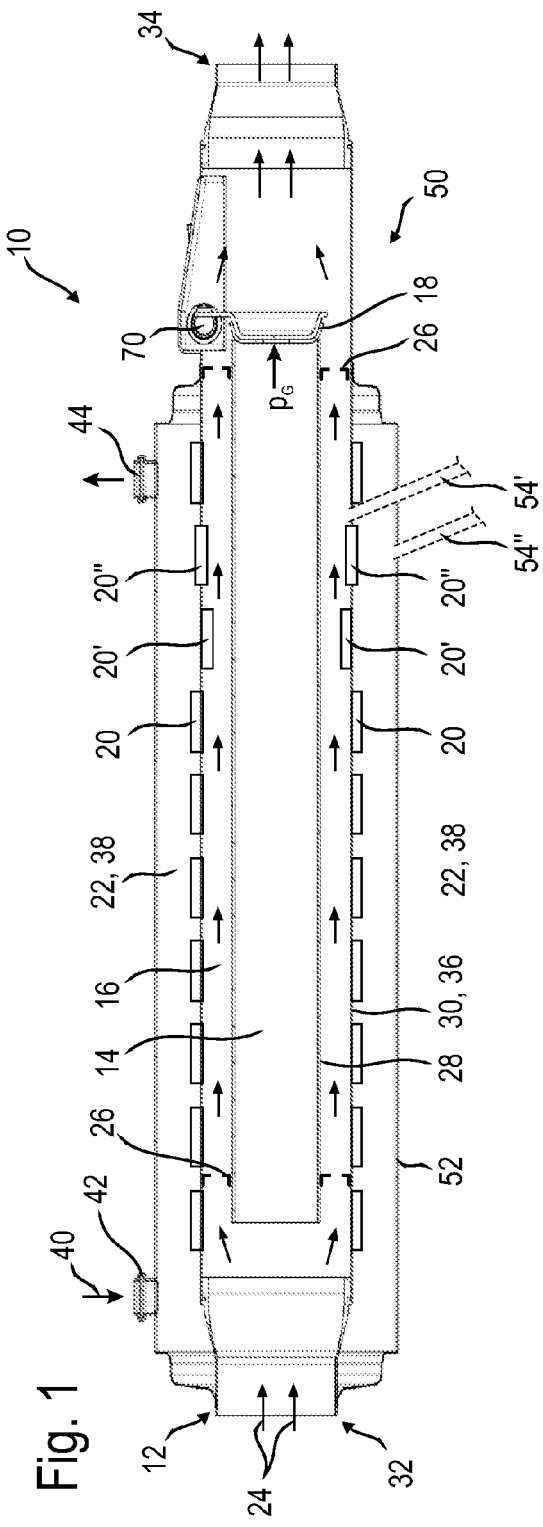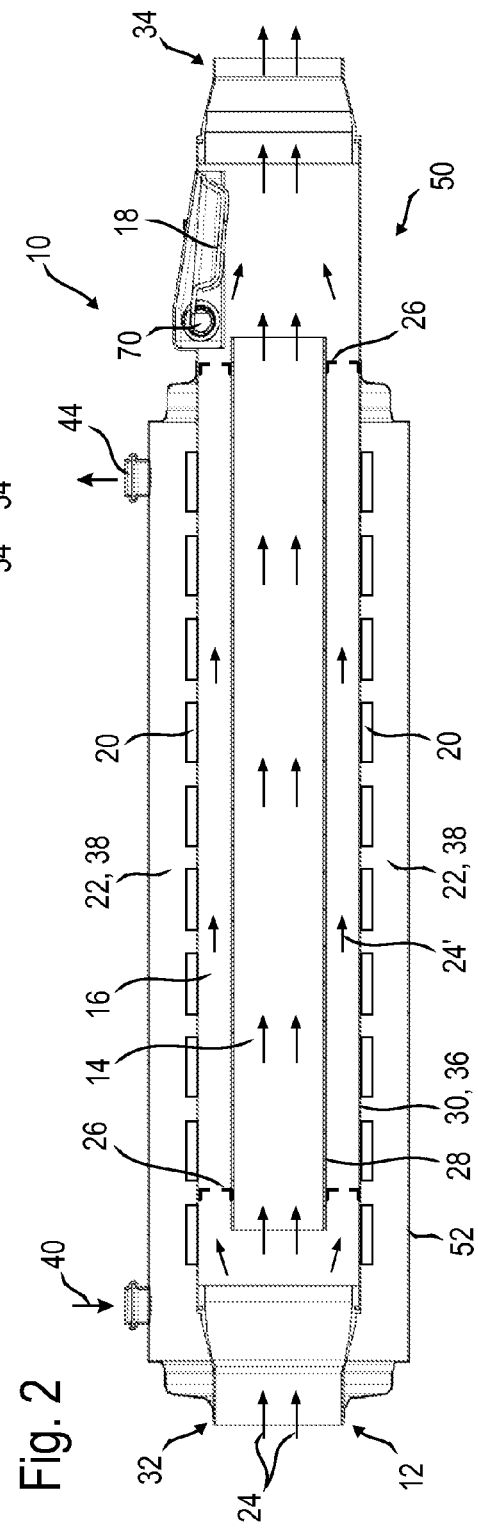

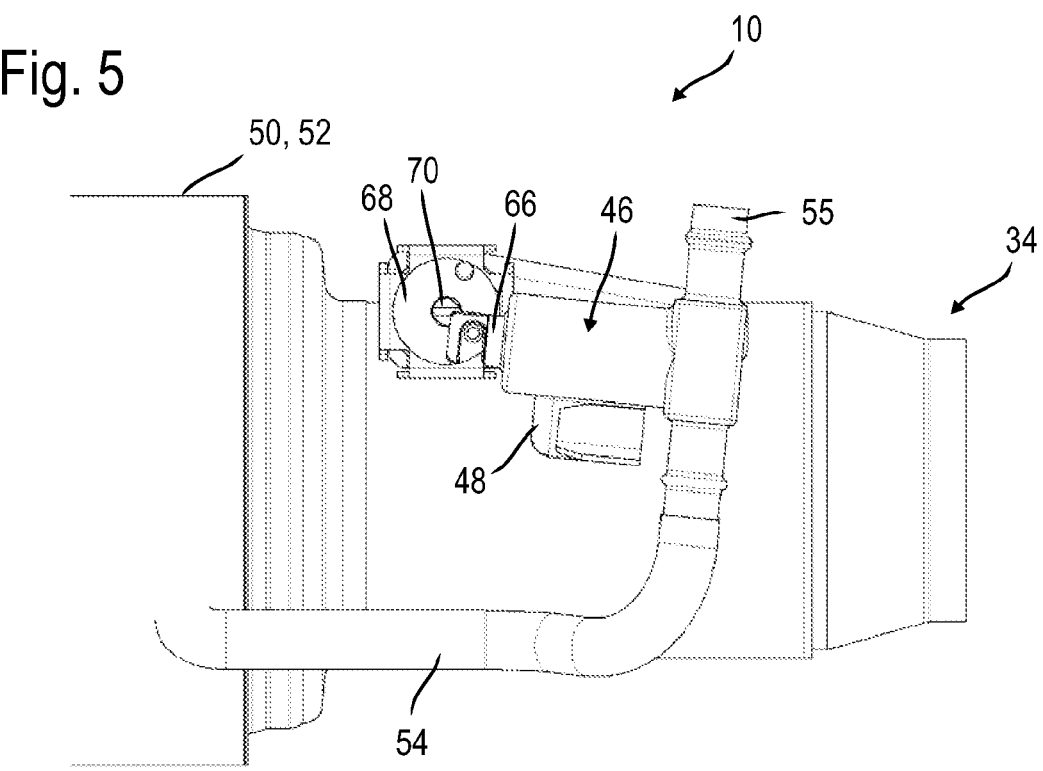

DEVICE FOR EXHAUST GAS HEAT UTILIZATION

RELATED APPLICATION

This application claims priority to German application 10 2010 011 472.3, which was filed 15 Mar. 2010.

FIELD OF THE INVENTION

This invention relates to a device for exhaust gas heat utilization in internal combustion engines of motor vehicles.

BACKGROUND

To improve the cold start behavior of internal combustion engines, a possible utilization of the exhaust gas heat has long since been known from the prior art. During the cold start phase the exhaust gas heat is transmitted to the cooling medium of a cooling circuit by using a heat exchanger in order to achieve a rather fast and uniform heating of the individual engine components via the cooling circuit. As such, the desired operating temperature can be reached faster and in addition the component wear, the fuel consumption and the pollutant emission until reaching the operating temperature can be reduced distinctly.

After reaching the operating temperature, a further heating of the cooling circuit by the exhaust gas stream, however, is undesired, in order to avoid overheating of the cooling circuit. Therefore, a switchable bypass system with at least two exhaust gas flow ducts connected in parallel usually exists in the region of the heat exchanger. The expenditure for the regulation and/or control, and for the usually electromotive actuation of such bypass system, is enormous in particular in view of the relatively short utilization during the cold start phase as seen over the entire operating period.

In EP 1 852 585 A1 a bypass system for internal combustion engines is described, which includes a considerably simplified control and actuation. The exhaust gas stream is regulated using an exhaust gas flap which is acted upon by a spring and can be actuated by a temperature-operated actuator with a thermocouple.

In conjunction with the global discussion on climate, increasingly stricter regulations with respect to energy efficiency and $CO_2$ emission of internal combustion engines are to be expected in the future. To deal with this problem, efforts have recently been made to utilize the exhaust gas heat of internal combustion engines during the entire engine operation, if possible, and preferably convert the same into electric energy, with which accumulators can be charged or electrical appliances can be operated. From the prior art, so-called "thermoelectric generator modules" (in the following: TEG modules) are already known, which convert thermal energy into electric energy. At present, however, in some operating conditions of the internal combustion engines the maximum exhaust gas temperature distinctly lies above the maximum admissible temperature with which the TEG modules may be acted upon. To avoid a destruction of the TEG modules due to overheating, complex and expensive protection measures therefore are required.

Therefore, it is important to create a device for exhaust gas heat utilization using TEG modules, in which the modules used are reliably protected against thermal overload with minimum effort.

SUMMARY

A device for exhaust gas heat utilization in internal combustion engines of motor vehicles comprises an exhaust gas line which in sections includes a first exhaust gas flow duct and a second exhaust gas flow duct connected in parallel. A valve flap is movable between a closed position and an open position, which can selectively close or at least partly clear a flow cross-section of the first or second exhaust gas flow duct. At least one thermoelectric generator module is thermally coupled with the second exhaust gas flow duct and with a cooling circuit. The device also includes an expansion material actuator for temperature-dependent actuation of the valve flap. By using the expansion material actuator, an expensive electronic control and an electric drive can be omitted in this device. The device for converting thermal exhaust gas energy into electric energy thereby becomes less expensive, so that it pays off faster via the electric energy generated and hence becomes more attractive for the user in economic terms.

In one embodiment, the second exhaust gas flow duct has an annular cross-section which encloses the cross-section of the first exhaust gas flow duct. This results in a particularly compact and robust construction of the device for exhaust gas heat utilization.

In a radial outer wall of the second exhaust gas flow duct a plurality of thermoelectric generator modules can be arranged. In this case, the thermal energy of the exhaust gas in the second exhaust gas flow duct can easily be transmitted to a side to be heated of the TEG modules, whereas the thermal energy of the exhaust gas in the first exhaust gas flow duct has no, or merely a negligible, influence on the TEG modules. Concretely, the TEG modules are mounted either on a radial inner surface of the outer wall, so that they protrude into the second exhaust gas flow duct, or on a radial outer surface of the outer wall, so that they radially protrude to the outside, and for example protrude into the cooling circuit. In addition, a configuration variant is conceivable in which the TEG modules are inserted into openings of the outer wall and protrude both into the second exhaust gas flow duct and into the cooling circuit.

In the region of the thermoelectric generator module(s) the cooling circuit preferably has an annular cross-section which extends around the outside of the thermoelectric generator modules. Due to this concentric, shell-type construction of the exhaust gas flow ducts, and of the cooling circuit, a particularly compact construction is obtained, in which the TEG modules are protected in the interior of the device for exhaust gas heat utilization. With this construction, the TEG modules also can be mounted with little effort, such that they adjoin a hot exhaust gas flow duct and the cold cooling circuit, so that a particularly efficient energy conversion is possible.

Preferably, the expansion material actuator is a purely mechanically operating actuator. This means that no electric sensors or driver (e.g. an electric motor) are necessary for the control and/or actuation of the actuator, which leads to considerable cost advantages.

In a further embodiment of the device for exhaust gas heat utilization a spring element is provided, which urges the valve flap into a closed position. With little effort, this spring element determines the closed position as the defined normal position of the valve flap.

The spring element in particular can be designed such that on reaching a specified gas pressure acting on the valve flap, the spring element is compressed, in order to allow a movement of the valve flap. As in commonly used internal combustion engines a good correlation exists between exhaust gas pressure and exhaust gas temperature, i.e. an increasing gas pressure usually is accompanied by a rising exhaust gas temperature. A thermal overload protection can already be realized for the TEG modules in most load cases by a suitable adjustment of the spring hardness of the spring element. The remaining critical load cases in which the exhaust gas temperature exceeds a temperature limit despite a relatively low gas pressure are taken into account by the expansion material actuator.

Preferably, the expansion material actuator urges the valve flap into its open position upon exceedance of a predeterminable temperature limit at the actuator. This pressurization and possibly adjustment of the valve flap into its open position preferably is effected against the spring force in case a spring element is present. With decreasing exhaust gas temperature, the spring element in this case advantageously moves both the expansion material actuator and the valve flap back into the respective normal position.

In one embodiment of the device for exhaust gas heat utilization, the expansion material actuator is thermally coupled with the exhaust gas stream and thus acted upon by an exhaust gas temperature. The activation temperature of the expansion material actuator can very easily be equaled to the predeterminable temperature limit of the TEG modules, wherein possibly a desired safety factor should also be taken into account.

In this case, a temperature-sensitive material of the expansion material actuator can be surrounded by the exhaust gas stream, wherein the temperature-sensitive material increasingly expands with rising temperature of the exhaust gas stream. Thus, the temperature-sensitive material substantially is acted upon by the same temperature as the TEG modules. Ideally, this activation temperature would almost correspond to the maximum temperature with which the TEG modules can be acted upon. The same lies in the order of about 300° C.

To better utilize the capacity of the TEG modules with the currently available expansion material actuators, the expansion material actuator in an alternative embodiment is thermally coupled with the cooling circuit and thus acted upon by a coolant temperature.

In this case, a temperature-sensitive material of the expansion material actuator preferably is surrounded by a coolant, wherein the temperature-sensitive material increasingly expands with rising temperature of the coolant. The coolant temperature usually lies in the range between 80° C. and 120° C., in any case considerably below the exhaust gas temperature. Correspondingly, the activation temperature of the expansion material actuator likewise drops into the range from about 80° C. to 120° C. Expansion material actuators with an activation temperature in this range already are easily available as vendor parts. In this embodiment, however, the existing exhaust gas temperature with which the TEG modules are acted upon must be estimated via the coolant temperature or the change thereof, in order to then determine an activation temperature of the expansion material actuator, with which overheating of the TEG modules is reliably prevented.

The expansion material actuator can include a drive element with a space filled with temperature-sensitive material, wherein the material increasingly expands with rising temperature and displaces a wall which is coupled with the valve flap, in order to move the same.

Furthermore, a spring element can be provided, which urges the valve flap into a closed position, wherein the spring element and the drive element are connected in series. This series connection means that the drive element of the expansion material actuator opens the valve flap against the spring force of the spring element. Thus, it is ensured that after a decrease of the exhaust gas temperature the valve flap is again moved into its closed position by the spring element and the expansion material actuator is again moved into its uncompressed normal position, without any further return elements being necessary for this purpose.

The cooling circuit preferably includes a liquid coolant (for example oil or water) or alternatively a gaseous coolant (for example air).

The used expansion material actuator in particular can be a wax actuator. The term wax actuator is used when the temperature-sensitive material is a wax such as hard paraffin. Depending on the desired activation temperature of the expansion material actuator, metals or oils can, however, also be used alternatively as temperature-sensitive material.

Particularly preferably, a flow resistance of the first exhaust gas flow duct is smaller than a flow resistance of the second exhaust gas flow duct, wherein the valve flap can selectively close or at least partly clear a flow cross-section of the first exhaust gas flow duct. As a result of this construction of the device for exhaust gas heat utilization it is ensured that when the first exhaust gas flow duct is open, the exhaust gas substantially flows through the first exhaust gas flow duct and an exhaust gas flow in the second exhaust gas flow duct drops to a residual flow without explicitly closing this duct.

These and other features of the present invention can be best understood from the following specification and drawings, of which the following is a brief description.

BRIEF DESCRIPTION OF THE DRAWINGS

Further features and advantages of the invention can be taken from the following description of a preferred embodiment with reference to the drawings, in which:

FIG. 1 shows a longitudinal section through a device for exhaust gas heat utilization in accordance with the invention with a valve flap in a closed position;

FIG. 2 shows a longitudinal section through a device for exhaust gas heat utilization in accordance with the invention with a valve flap in an open position;

FIG. 5 shows a side view of the device for exhaust gas heat utilization according to FIG. 1 in the region of the expansion material actuator.

DETAILED DESCRIPTION

Figure 3:
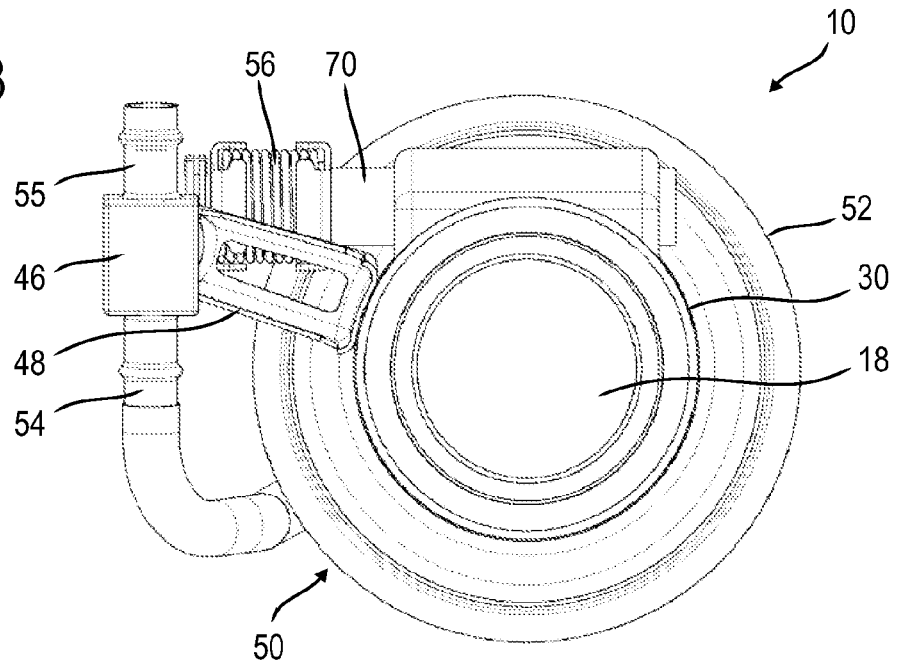
FIG. 3 shows a front view of the device for exhaust gas heat utilization according to FIG. 1 as seen from a downstream position.

FIGS. 1 and 2 show a device 10 for exhaust gas heat utilization in internal combustion engines of motor vehicles, comprising an exhaust gas line 12 which in sections includes a first exhaust gas flow duct 14 and a second exhaust gas flow duct 16 connected in parallel. A movable valve flap 18 can close or at least partly clear the flow cross-section of the first exhaust gas flow duct 14. At least one TEG module 20 is thermally coupled with the second exhaust gas flow duct 16 and with a cooling circuit 22.

According to FIG. 1, the valve flap 18 takes a closed position in which the valve flap 18 closes the first exhaust gas flow duct 14, so that in the region of the exhaust gas flow ducts 14, 16 connected in parallel, an exhaust gas stream 24 of the exhaust gas line 12 exclusively flows through the second exhaust gas flow duct 16 apart from a negligible leakage.

On the other hand, the valve flap 18 according to FIG. 2 is in an open position in which the valve flap 18 clears the first exhaust gas flow duct 14, so that in the region of the exhaust gas flow ducts 14, 16 connected in parallel, the exhaust gas stream 24 of the exhaust gas line 12 can flow both through the first exhaust gas flow duct 14 and through the second exhaust gas flow duct 16.

According to FIG. 1, the second exhaust gas flow duct 16 has an annular cross-section which surrounds the cross-section of the first exhaust gas flow duct 14. The exhaust gas flow ducts 14, 16 here are formed as concentric tube sections 28, 30 which are fixed relative to each other using the spacers 26. At an upstream end 32 and at a downstream end 34 of the device 10 the exhaust gas line 12 passes over into the tube section 30.

Upstream and downstream of the (inner) tube section 28, the exhaust gas stream 24 is guided in a single cross-section, whereas in the region of the (inner) tube section 28 the two exhaust gas flow ducts 14, 16 connected in parallel are obtained, in which the exhaust gas stream 24 of the exhaust gas line 12 can split up. At the downstream end 34 of the device 10 the valve flap 18 is provided, which can close the first exhaust gas flow duct 14, more exactly a downstream end of the inner tube section 28.

Seen in flow direction, the exhaust gas line 12 thus merely includes two separate flow cross-sections between an upstream end of the tube section 28 and the valve flap 18, namely the first exhaust gas flow duct 14 and the second exhaust gas flow duct 16, wherein the exhaust gas stream 24 is divided between the first and the second exhaust gas flow ducts 14, 16 in dependence on the valve flap position.

In the region of the exhaust gas flow ducts 14, 16 connected in parallel the above-mentioned TEG modules 20 are arranged on a radial outer wall 36 of the second exhaust gas flow duct 16, i.e. according to FIG. 1 at the tube section 30.

As an alternative to the embodiment shown in FIGS. 1 to 4, the valve flap 18 might also selectively close or at least partly clear a flow cross-section of the second exhaust gas flow duct 16. Expressed in functional terms, the division of the exhaust gas stream 24 between the first exhaust gas flow duct 14 and the second exhaust gas flow duct 16 can simply be determined by the valve flap 18.

In the illustrated embodiment, a flow resistance of the first exhaust gas flow duct 14 is smaller than a flow resistance of the second exhaust gas flow duct 16 (with open valve flap 18), wherein the valve flap 18 can selectively close or at least partly clear the flow cross-section of the first exhaust gas flow duct 14. Correspondingly, this results in the situation that with open valve flap 18 the exhaust gas flows through the device 10 for exhaust gas heat utilization for the most part via the first exhaust gas flow duct 14. Since the second exhaust gas flow duct 16, however, is not closed in a gas-tight manner, a residual flow 24' is obtained in the second exhaust gas flow duct 16. This residual flow 24' can be adjusted via the flow resistances of the exhaust gas flow ducts 14, 16. The flow resistance can be influenced with little effort by baffle plates, shutters or the like.

According to FIGS. 1 and 2, spacers 26 formed as shutters are provided in the second exhaust gas flow duct 16, by way of example, in order to increase the flow resistance in the second exhaust gas flow duct 16. With open valve flap 18 the residual flow 24' in any case is adjusted such that even at maximum exhaust gas temperature it does not lead to an overheating of the TEG modules 20.

In the closed position of the valve flap 18 no exhaust gas flow is possible in the first exhaust gas flow duct 14, so that despite a higher flow resistance the exhaust gas substantially must flow completely through the second exhaust gas flow duct 16.

The cooling circuit 22, only partly shown in FIGS. 1 and 2, has an annular cross-section in the region of the TEG modules 20, which extends around the outside of the modules 20. The TEG modules 20 for the most part are mounted on a radial outer surface of the outer wall 36, so that they radially protrude into the cooling circuit 22, more exactly into an annular space 38 of the cooling circuit 22. Alternatively, the TEG modules 20 can also be attached to a radial inner surface of the outer wall 36 and thus protrude into the second exhaust gas flow duct 16, more exactly into the annular cross-section of the second exhaust gas flow duct 16. This is indicated in FIG. 1 by way of example by two TEG modules which are provided with the reference numeral 20'. In addition, a configuration variant is conceivable in which the TEG modules 20 are inserted into openings of the outer wall 36 and protrude both into the second exhaust gas flow duct 16 and into the cooling circuit 22, which is indicated in FIG. 1 by way of example by two TEG modules 20".

Independent of the constructive configuration, it is important that a "hot side" of the TEG modules 20 has a good thermal coupling to the exhaust gas stream 24 in the second exhaust gas flow duct 16, which is ensured in particular by heat conduction, and a "cold side" of the TEG modules 20 has a good thermal coupling to a coolant 40 of the cooling circuit 22, which is ensured in particular by heat conduction. Due to the necessary cabling of the TEG modules 20 for dissipating the electric energy generated, the two variants in which the TEG modules 20, 20" protrude into the cooling circuit 22 appear to be particularly advantageous, as in these cases the cabling is subjected to a smaller thermal load.

Alternatively, the cooling circuit 22 can be filled with a liquid coolant 40 (e.g. oil or water) or with a gaseous coolant 40 (e.g. air). In particular when using liquid coolants 40, attention should be paid to a good insulation of the cabling of the TEG modules 20.

In FIGS. 1 and 2 only the annular space 38 of the cooling circuit 22, as well as an inlet port 42 and an outlet port 44 are shown, which both open into the annular space 38. In general, the (closed) cooling circuit 22 additionally includes a coolant cooler (not shown) and possibly further built-in elements. The cooling circuit 22 in particular can be a separate cooling circuit exclusively for cooling the TEG modules 20 or alternatively a general cooling circuit to which further appliances to be cooled are connected. For example, the TEG modules 20 as well as an air conditioner for tempering the vehicle interior (not shown) can be connected to the same cooling circuit 22. Furthermore, it is conceivable that the TEG modules 20 are cooled via an engine cooling circuit of the motor vehicle.

FIG. 3 shows a front view of the device 10 for exhaust gas heat utilization as seen from the downstream end 34, i.e. according to FIG. 1 from the right end of the device 10. In this representation, an expansion material actuator 46 for the temperature-dependent actuation of the valve flap 18 is shown, which is mounted on a housing 50 of the device 10 via a holding arm 48. This housing 50 in particular comprises the tube 52 of the cooling circuit 22, which forms the annular space 38, and parts of the tube section 30. The expansion material actuator 46 includes a supply line 54 branching from the housing 50 and a discharge line 55 via which the expansion material actuator 46 can be acted upon thermally.

In addition, FIG. 3 shows a spring element 56 which urges the valve flap 18 into its closed position. In the present case, the spring element 56 constitutes a spiral spring which is subjected to a torsional load and moreover is designed such that it is compressed upon reaching a specified gas pressure $p_G$ acting on the valve flap 18 (cf. FIG. 1), in order to allow a movement of the valve flap 18. As in commonly used internal combustion engines a good correlation exists between exhaust gas pressure and exhaust gas temperature, i.e. an increasing gas pressure usually is accompanied by a rising exhaust gas temperature. A thermal overload protection in most load cases can already be realized for the TEG modules 20 by a suitable adjustment of the spring hardness of the spring element 56. The remaining critical load cases, in which the exhaust gas temperature exceeds a temperature limit despite a relatively low gas pressure (<$p_G$), then are taken into account by the temperature-sensitive expansion material actuator 46.

Figure 4:
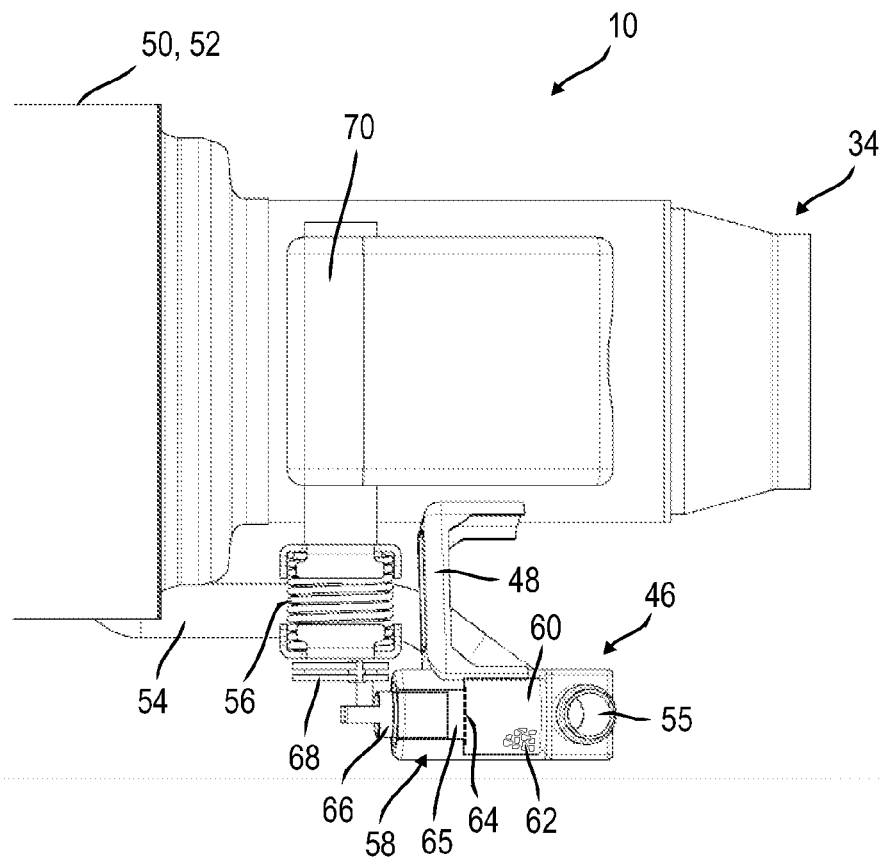
FIG. 4 shows a top view of the device for exhaust gas heat utilization according to FIG. 1 in the region of an expansion material actuator.

FIG. 4 shows a top view of the device 10 for exhaust gas heat utilization in the region of the expansion material actuator 46. Such actuators already are generally known from the prior art, so that their construction is indicated here merely schematically. It should be emphasized that the expansion material actuators 46 used are purely mechanically operating actuators and correspondingly require neither electronic sensors nor electric actuating elements such as an electric motor.

Normally, the expansion material actuator 46 includes a drive element 58 with a space 60 which is filled with a temperature-sensitive material 62, wherein the material 62 increasingly expands with rising temperature and displaces a wall 64 which is coupled with the valve flap 18, in order to move the same.

In the present embodiment, the wall 64 is a membrane which can be pressed into a gas-filled, sealed piston space 65 by the temperature-sensitive material 62 in order to extend a piston 66 and ultimately adjust, in particular open the valve flap 18 via a coupled lever wheel 68 (cf. FIG. 5) and the shaft 70.

In dependence on the desired activation temperature of the expansion material actuator 46, e.g. oils or metals can be used as temperature-sensitive material 62. Alternatively, various kinds of wax such as hard paraffin are also employed as temperature-sensitive material 62, which is why the expansion material actuator 46 in these cases also is referred to as wax actuator.

Upon exceedance of a predeterminable temperature limit at the expansion material actuator 46, more exactly at the temperature-sensitive material 62 of the expansion material actuator 46, the expansion material actuator 46 urges the valve flap 18 into its open position according to FIG. 2.

In one configuration variant the expansion material actuator 46 is thermally coupled with the exhaust gas stream 24 and thus acted upon by an exhaust gas temperature. In general, this means that the temperature-sensitive material 62 of the expansion material actuator 46 is directly surrounded by the exhaust gas stream 24, with the temperature-sensitive material 62 increasingly expanding with rising temperature of the waste gas stream 24. Alternatively, the temperature-sensitive material 62 can also be coupled with the exhaust gas stream 24 indirectly, e.g. via a heat-conducting partition.

In constructive terms, these configuration variants merely differ in that the supply line 54 is connected either to the second exhaust gas flow duct 16 or to the cooling circuit 22. These variants are schematically indicated in FIG. 1 and provided with the reference numerals 54' and 54", respectively.

The advantage of the temperature-sensitive material 62 coupled with the exhaust gas stream 24 consists in that the limit temperature, i.e. the activation temperature of the expansion material actuator 46, can orient itself to the maximum temperature with which the TEG modules 20 may at best be acted upon, as both the temperature-sensitive material 62 and the TEG modules 20 are equally acted upon by the exhaust gas temperature. The maximum temperature with which the TEG modules 20 may be acted upon usually lies in the order of about 300° C.

The advantage of a temperature-sensitive material 62 surrounded by the coolant 40 consists in that in operation of the vehicle the coolant temperatures are about 70° C. to 100° C., wherein expansion material actuators 46 with activation temperatures in this range are easily available. However, there is the disadvantage that the exhaust gas temperature acting on the TEG modules 20 must be inferred from the coolant temperature or the change in the coolant temperature. This can become quite expensive in particular when apart from the TEG modules 20 further appliances to be cooled are connected to the cooling circuit 22. In this case, the temperature spectrum of the coolant 40 and the influence exerted on the coolant temperature by the TEG modules 20 and the further appliances to be cooled must be analyzed exactly and the activation temperature of the expansion material actuator 46 must especially be adjusted to these marginal conditions, in order to be able to ensure an efficient energy generation by the TEG modules 20 and largely exclude the risk of overheating of the TEG modules 20. The temperature limit and the activation temperature of the expansion material actuator 46, respectively, usually lie between about 80° C. and 100° C.

FIG. 5 shows a side view of the device 10 for exhaust gas heat utilization in the region of the expansion material actuator 46. This Figure clearly shows that a movable piston 66 of the expansion material actuator 46 engages a lever wheel 68 which in turn is connected with a shaft 70 of the valve flap 18. In conjunction with FIG. 4 it also becomes clear that the spring element 56, which urges the valve flap 18 into its closed position, is connected in series with the expansion material actuator 46, more exactly the drive element 58 of the expansion material actuator 46. This means that upon exceedance of the limit temperature the expansion material actuator 46 will open the valve flap 18 against the spring force of the spring element 56. Correspondingly, after a decrease in temperature at the expansion material actuator 46, the spring element 56 will provide for a return of the valve flap 18 into its closed normal position. At the same time, the expansion material actuator 46 also is returned into its normal position via the spring force, wherein the normal position of the expansion material actuator 46 corresponds to a situation according to FIGS. 4 and 5 with retracted piston 66.

Although an embodiment of this invention has been disclosed, a worker of ordinary skill in this art would recognize that certain modifications would come within the scope of this invention. For that reason, the following claims should be studied to determine the true scope and content of this invention.

What is claimed is:

1. A device for exhaust gas heat utilization in internal combustion engines of motor vehicles, comprising:
   an exhaust gas line which in sections includes a first exhaust gas flow duct and a second exhaust gas flow duct connected in parallel,
   a valve flap movable between a closed position and an open position, which can selectively close or at least partly clear a flow cross-section of the first exhaust gas flow duct,
   at least one thermoelectric generator module which is thermally coupled with the second exhaust gas flow duct and with a cooling circuit,
   an expansion material actuator for temperature-dependent actuation of the valve flap,
   a spring element that urges the valve flap into a closed position,
   wherein upon exceedance of a predeterminable temperature limit at the expansion material actuator, the expansion material actuator urges the valve flap into an open position, and wherein a temperature-sensitive material of the expansion material actuator is surrounded by the exhaust gas stream, and wherein the temperature-sensitive material increasingly expands with rising temperature of the exhaust gas stream.

2. The device according to claim 1, wherein the second exhaust gas flow duct has an annular cross-section which surrounds the first exhaust gas flow duct.

3. The device according to claim 2, wherein on a radial outer wall of the second exhaust gas flow duct a plurality of thermoelectric generator modules are arranged.

4. The device according to claim 1, wherein in a region of the at least one thermoelectric generator module, the cooling circuit has an annular cross-section which extends around an outside of the thermoelectric generator module.

5. The device according to claim 1, wherein the expansion material actuator is a purely mechanically operating actuator.

6. The device according to claim 1, wherein the expansion material actuator is thermally coupled with an exhaust gas stream and thus acted upon by an exhaust gas temperature.

7. The device according to claim 1, wherein the expansion material actuator is thermally coupled with the cooling circuit and thus acted upon by a coolant temperature.

8. The device according to claim 7, wherein a temperature-sensitive material of the expansion material actuator is surrounded by a coolant, and wherein the temperature-sensitive material increasingly expands with rising temperature of the coolant.

9. The device according to claim 1, wherein the expansion material actuator includes a drive element with a space filled with temperature-sensitive material, and wherein the temperature-sensitive material increasingly expands with rising temperature and displaces a wall which is coupled with the valve flap, in order to move the valve flap.

10. The device according to claim 9, including a spring element that urges the valve flap into a closed position, wherein the spring element and the drive element are connected in series.

11. The device according to claim 1, wherein the cooling circuit includes a liquid or gaseous coolant.

12. The device according to claim 1, wherein the expansion material actuator is a wax actuator.

13. The device according to claim 1, wherein a flow resistance of the first exhaust gas flow duct is smaller than a flow resistance of the second exhaust gas flow duct, and wherein the valve flap can selectively close or at least partly clear a flow cross-section of the first exhaust gas flow duct.

14. A device for exhaust gas heat utilization in internal combustion engines of motor vehicles, comprising:
an exhaust gas line which in sections includes a first exhaust gas flow duct and a second exhaust gas flow duct connected in parallel,
a valve flap movable between a closed position and an open position, which can selectively close or at least partly clear a flow cross-section of the first or second exhaust gas flow duct,
at least one thermoelectric generator module which is thermally coupled with the second exhaust gas flow duct and with a cooling circuit, and
an expansion material actuator for temperature-dependent actuation of the valve flap, and wherein the expansion material actuator is thermally coupled with an exhaust gas stream and thus acted upon by an exhaust gas temperature, and wherein a temperature-sensitive material of the expansion material actuator is surrounded by the exhaust gas stream, and wherein the temperature-sensitive material increasingly expands with rising temperature of the exhaust gas stream.

15. A device for exhaust gas heat utilization in internal combustion engines of motor vehicles, comprising:
an exhaust gas line which in sections includes a first exhaust gas flow duct and a second exhaust gas flow duct connected in parallel, wherein the second exhaust gas flow duct has an annular cross-section which surrounds the first exhaust gas flow duct,
a valve flap movable between a closed position and an open position, which can selectively close or at least partly clear a flow cross-section of the first or second exhaust gas flow duct,
at least one thermoelectric generator module which is thermally coupled with the second exhaust gas flow duct and with a cooling circuit,
an expansion material actuator for temperature-dependent actuation of the valve flap, and wherein a temperature-sensitive material of the expansion material actuator is surrounded by the exhaust gas stream, and wherein the temperature-sensitive material increasingly expands with rising temperature of the exhaust gas stream.

16. The device according to claim 15, including a spring element that urges the valve flap into a closed position.

17. The device according to claim 16, wherein the spring element is designed such that upon reaching a specified gas pressure acting on the valve flap the spring element is compressed, in order to allow a movement of the valve flap.

18. The device according to claim 15, wherein upon exceedance of a predeterminable temperature limit at the expansion material actuator, the expansion material actuator urges the valve flap into an open position.

19. The device according to claim 15, wherein the expansion material actuator is thermally coupled with an exhaust gas stream and thus acted upon by an exhaust gas temperature.

* * * * *